US012606272B2

(12) United States Patent
Mercat

(10) Patent No.: US 12,606,272 B2
(45) Date of Patent: Apr. 21, 2026

(54) GEAR MOTOR AND ASSOCIATED CYCLE

(71) Applicant: MAVIC GROUP, Chavanod (FR)

(72) Inventor: Jean-Pierre Mercat, Chavanod (FR)

(73) Assignee: MAVIC GROUP, Chavanod (FR)

( * ) Notice: Subject to any disclaimer, the term of this patent is extended or adjusted under 35 U.S.C. 154(b) by 769 days.

(21) Appl. No.: 18/046,599

(22) Filed: Oct. 14, 2022

(65) Prior Publication Data

US 2023/0192231 A1      Jun. 22, 2023

(30) Foreign Application Priority Data

Oct. 14, 2021    (FR) ..................................... 21 10903

(51) Int. Cl.
B62M 6/55        (2010.01)
H02K 7/116        (2006.01)
(52) U.S. Cl.
CPC .............. B62M 6/55 (2013.01); H02K 7/116 (2013.01)
(58) Field of Classification Search
CPC ................................. B62M 6/55; H02K 7/116
USPC ....................................................... 180/206.4
See application file for complete search history.

(56) References Cited

U.S. PATENT DOCUMENTS

| | | | | | |
|---|---|---|---|---|---|
| 4,744,678 | A | * | 5/1988 | Fickelscher | ............. F16C 19/24 384/572 |
| 9,490,679 | B2 | * | 11/2016 | Yamamoto | ............... B60K 1/00 |
| 11,078,991 | B2 | * | 8/2021 | Nagumo | ............... F16C 19/463 |

| | | | | | |
|---|---|---|---|---|---|
| 2002/0111243 | A1 | * | 8/2002 | Minegishi | ................. F16H 1/32 475/183 |
| 2004/0238264 | A1 | * | 12/2004 | Zernickel | ................ F16C 33/34 180/444 |
| 2011/0180341 | A1 | * | 7/2011 | Chan | ........................ F16H 3/724 474/152 |

(Continued)

FOREIGN PATENT DOCUMENTS

| | | | | | |
|---|---|---|---|---|---|
| EP | | 1614914 B1 | * | 1/2014 | ........... F16C 19/364 |
| JP | H03277809 A | * | 12/1991 | | |

(Continued)

OTHER PUBLICATIONS

French Preliminary Search Report and Written Opinion Issued Jun. 7, 2022 in French Application 21 10903 filed on Oct. 14, 2021 (with English Translation of Categories of Cited Documents), 10 pages.

*Primary Examiner* — John Olszewski
*Assistant Examiner* — Nathaniel William Watkins
(74) *Attorney, Agent, or Firm* — Oblon, McClelland, Maier & Neustadt, L.L.P.

(57)                ABSTRACT

A gear motor of an electrical assistance device, in particular for a cycle, includes a gear reducer and an electric motor including a stator and a rotor integral in rotation with a shaft forming the input of the gear reducer. The gear reducer includes a toothed crown integral with the stator, a satellite-carrier fitted to pivot around the shaft, and forming the output of the gear reducer, at least two planet wheels fitted firstly on respective eccentric cams via a respective bearing. The ge ar motor also includes a rotor bearing to center a first end of the shaft on a fixed shaft of the gear motor, and a bearing device including deformable rolling elements. The bearing device is interposed between the satellite-carrier and a cylindrical receptacle which is integral with the stator, to center the shaft in the cylindrical receptacle at a second end.

20 Claims, 11 Drawing Sheets

(56)                        References Cited

U.S. PATENT DOCUMENTS

2013/0045827 A1\*    2/2013   Kobayashi ............. B62M 11/16
                                                                        475/180
2020/0063793 A1\*    2/2020   Rossberger ............. F16C 19/12

FOREIGN PATENT DOCUMENTS

JP             9-169290  A      6/1997
JP            2015-21514  A     2/2015
WO      WO 2014/103212  A1     7/2014

\* cited by examiner

A-A

GEAR MOTOR AND ASSOCIATED CYCLE

TECHNICAL FIELD OF THE INVENTION

The invention concerns a gear motor, in particular for a cycle, as well as a cycle equipped with a gear motor of this type in order to provide electrical assistance with pedalling.

Electrical assistance cycle users are requiring increasingly very light and compact assistance motors in order to approximate the appearance and sensations of traditional, non-assisted bicycles. Also, very silent assistance motors are required in order to avoid disturbing cyclists seeking a quiet moment of relaxation.

Gear reducers of the cycloidal or epicycloidal type make it possible to obtain substantial reduction ratios in a small space.

The input and output shafts of most of these gear reducers are solid. However some of these gear reducers make it possible to transmit a movement of rotation between a hollow input shaft and a coaxial hollow output flange, with the central orifice permitting passage of a shaft, such as a crank gear shaft or a wheel shaft.

Document FR3091516 shows an example of a gear reducer of this type fora cycle.

An embodiment according to the prior art described in this document is illustrated schematically in FIG. 12. This diagram shows the central shaft 103 of the crank gear in which two crank arms 104 are embedded, transmitting the force which the cyclist exerts on the pedals. The plate 105 permits engagement of the chain, which transmits the drive power created by the cyclist and the assistance motor 3 to the rear wheel. The central shaft 103 of the crank gear is supported in rotation by two bearings 108 situated at the two ends of the housing 7.

The gear reducer according to the prior art comprises a plurality of planet wheels 12, 13 fitted on eccentric cams 14 of the input shaft 5 via ball bearings. These planet wheels 12, 13 engage on a toothed crown 10 of the gear reducer. In one possible configuration, the planet wheels 12, 13 have passing through them output shafts of a satellite-carrier 11 forming the output of the gear reducer. The input shaft 5 of the gear reducer is fitted such as to pivot relative to the central shaft of the crank gear, by means of two ball bearings 109 situated at the two ends of this shaft 5.

A disadvantage of these gear reducers is that they are subjected to substantial radial forces which are exerted in particular on the planet wheels, as a result of the high output torque. Use of a plurality of planet wheels which are phase-shifted in rotation makes it possible to compensate for the forces exerted. However, this compensation for the stresses may not be perfectly balanced.

A first problem is that the slightest difference of positioning of the parts relative to one another can give rise to a pressure point or blockage. However in use, when the gear motor is fitted on the crank gear shaft in particular, the pedalling force as well as the tension of the transmission chain give rise to a very high load on the bearings which support the crank gear, which can give rise to radial displacement of the centre of the gear reducer by several tens of microns. In addition, the force sensor incorporated which makes it possible to determine the torque of the cyclist will also be deformed under the effect of the chain tension, thus adding a radial displacement of several tens of microns. This resulting radial displacement can create numerous pressure points, in particular as a result of the connection of the gear motor to the crank gear shaft by two ball bearings. Even though slight movement of the planet wheels is permitted, the friction generated between the pinions and the crown can downgrade the performance of the gear reducer considerably. This coaxiality defect can also give rise to substantial noise and sensations of vibrations when pedalling.

Thus, with reference to FIG. 12 according to the prior art, under the effect of the different loads applied to the central shaft 103 of the crank gear, in particular as a consequence of the tension of the chain and the forces which the cyclist will apply to each of the pedals, the central shaft 103 of the crank gear as well as the two ball bearings 108 which support it will be deformed, and give rise to radial displacements along this central shaft 103 of the crank gear.

The deformation of the central shaft 103 of the crank gear in operation under load displaces radially the respective centres of the two ball bearings 109 of the shaft 5, which drive the shaft 5 with them in a movement of rotation which is more or less eccentric relative to the fixed shaft of a cylindrical receptacle of the housing 7. In the knowledge that the planet wheels 12 and 13 pivot around their respective cam 14, themselves connected to the shaft 5, all of these parts follow the radial displacements imposed by the deformation of the central shaft 103 of the crank gear. However, the planet wheels 12, 13 engage in the toothed crown 10 which is centred relative to the fixed shaft of the housing 7. As a result, the slightest defect of radial placement of each of the pinions 12, 13 can then give rise to pressure points, engagement defects, and major parasitic radial forces which are responsible for losses of performance and generate vibrations and noise, even if these radial displacements are only approximately a few tens of micrometres.

A second problem is that, when the torque transmitted by each of the planet wheels is poorly distributed between the pinions, the radial forces generated by the toothing contacts can not be well-balanced, which can generate parasitic radial forces on the bearings which make it possible to centre the rotor. These bearings, rotating very fast, then give rise to significant losses of performance, which themselves can cause heating of the rotor and an increase in the vibrations and noise emitted by the gear motor.

The dissymmetry of the torque transmitted by the planet wheels can be derived from different origins.

Firstly, it can be derived from the above-described radial displacements and production tolerances of the pinions and toothing. In fact, the fitting of the planet wheels which transmit the torque in a parallel manner is hyperstatic, and in theory, if everything were infinitely rigid, only one of the pinions would transmit torque (at least temporarily), and it is only thanks to the flexibility of the parts and contacts that the torque would be distributed between the pinions. Thus, the greater the precision of production of the parts, the better the distribution of torque is. However, this precision has technological and economical limits.

Secondly, the dissymmetry of the torque transmitted can be derived from the dissymmetry of the cam values. In fact, it is necessary for the cams of the planet wheels to be perfectly symmetrical. Since this cam value is low, generally approximately 0.7 mm, a minimum cam difference of only 7 μm generates a relative difference of 1%, which can give rise to significant dissymmetry as a consequence of the hyperstatism of the fitting.

Thirdly, the dissymmetry of the torque transmitted can be derived from the dissymmetry of the fitting of the planet wheels. In fact, the satellite-carrier of the gear reducer comprises two flanges, which each receive six ball bearings positioned at each of the ends of the shafts of the gear reducer. These two flanges are connected to one another by means of six braces which pass through the pinions, through six holes which have a gap which is sufficient for them never to come into contact with the braces. These braces are embedded in each of the flanges by the tightening of six screws which pass through the braces and connect the two flanges. In the first configuration described above, in which the satellite-carrier forms the output of the gear reducer, and in the case when the gear motor is fitted in the crank gear casing, the output torque of the gear reducer is transmitted to the crank gear by means of a free wheel which makes it possible to transmit the assistance torque. Thus, the flange transmits only a pure torque, while being perfectly free radially to release these two degrees of freedom. In the knowledge that the output torque of the gear reducer is transmitted only by the flange in association with the coupling in rotation, the other flange receives a torque from the bearings which it will transfer directly to the braces. Thus, the pinion which is on this side will transmit most of its torque by means of these braces, whereas the pinion which is situated on the side of the flange associated with the coupling will transmit most of its torque directly to the flange in association with the coupling. However, the transmission of the torque gives rise to deformation of the parts, and in particular of the braces. This deformation thus tends to delay the pinion by transmitting its torque indirectly relative to the other, which transmits its torque directly, and thus the torque ratio between the two pinions is inevitably unbalanced, which gives rise to radial overloading of the bearings which make it possible to centre the rotor, and tends to downgrade the performance and operation of the gear reducer.

These same problems of hyperstatism are also present in the case when the gear motor is fitted on the wheel shaft.

These same problems can also be encountered in the case of other apparatuses which use electrical assistance devices such as, for example, exoskeleton electrical assistance devices, portable electrical equipment, or robotisation arms, where the operating noise and compactness are important criteria.

SUMMARY OF THE INVENTION

An objective of the present invention is to eliminate the aforementioned disadvantages at least partly. In particular, one of the objectives of the invention is to make the production of the gear motor more silent in operation and more tolerant to manufacturing defects, in order to facilitate its production and also reduce its manufacturing cost. Another objective of the present invention is to propose a particularly light gear motor.

For this purpose, the subject of the invention is a gear motor of an electrical assistance device, in particular for a cycle, comprising a gear reducer and an electric motor which are configured to be able to be fitted coaxially on a central shaft, such as a rotary central shaft or a fixed central shaft, the electric motor comprising a stator and a rotor which are integral in rotation with a shaft forming the input of the gear reducer, the gear reducer comprising a toothed crown which is integral with the stator, a satellite-carrier which is fitted such as to pivot via at least one flange bearing around the shaft, the satellite-carrier forming the output of the gear reducer, at least two planet wheels which are fitted firstly on respective eccentric cams via a respective bearing, the eccentric cams being integral with the shaft, the planet wheels engaging on the toothed crown while being phase-shifted in rotation, characterised in that the gear motor also comprises a rotor bearing which is configured to centre a first end of the shaft on a fixed shaft of the gear motor, and a bearing device comprising deformable rolling elements, the bearing device being interposed between the satellite-carrier and a cylindrical receptacle which is integral with the stator, for the centring of the shaft in the cylindrical receptacle at a second end.

The shaft which is integral in rotation with the rotor of the electric motor rotates on the rotor bearing placed at one of its ends, whereas the other end is left "free or floating", in order to self-centre under the opposing radial thrust of the planet wheels. Thus, this second end is positioned radially by itself when a significant transmission torque is transmitted.

On the other hand in unloaded operating phases, i.e. when no transmission torque is being transmitted, or in the case of low levels of torque, the second end of the gear reducer is self-centred by the deformable rolling elements.

The centring of the second end by the deformable rolling elements in the case of low levels of torque makes it possible to prevent the planet wheels from drifting or rather beating in their functional gap, which could then give rise to an unpleasant noise; in fact, in the absence of the elements, the gear reducer could not pre-position itself suitably, which could also damage the toothing.

The self-centring of the shaft by the deformable rolling elements makes it possible for it no longer to be guided radially rigidly at its second end on the planet wheel side by a ball bearing as in the prior art. This second end is allowed to self-centre until balance of the radial forces generated by each of the planet wheels is obtained. This balance is made possible by the release of two degrees of freedom in a flat movement substantially normal to the axis of rotation of the rotor.

In addition, the self-centring of the planet wheels makes it possible to distribute better the torque transmitted by each of the pinions. This improved distribution of the torque makes it possible to be able to produce a gear motor with lower production precision, which facilitates its production and reduces its manufacturing cost. Also, the eccentric cams of the planet wheels no longer need to be perfectly phase-shifted relative to one another. This type of defect is no longer problematic, since the shaft self-centres in the middle of the eccentric cams under the balance of the radial forces of the pinions. In addition, the absence of rigid radial guiding on the part of the pinions means that the possible dissymmetries of the torque transmitted between the planet wheels can no longer give rise to an excess radial load on the pinion side bearing, which gives rise to noise, losses of performance, and increase of the wear.

In the case when the gear motor is fitted around a rotary central shaft, for example in a cycle crank gear, the cylindrical receptacle is formed in a housing. The housing is fixed relative to the framework, i.e. relative to the frame in the case of a cycle. The fixed shaft is the shaft of the cylindrical receptacle of the housing. The bearing device is interposed between the satellite-carrier and the cylindrical receptacle of the housing.

In the case when the gear motor is fitted around a fixed central shaft, for example in a hub, such as of a cycle wheel, the central shaft is fixed relative to the framework, i.e. relative to the frame in the case of a cycle. The fixed shaft is then the central shaft of the hub. The cylindrical receptacle is formed in a bell housing which is secured on the central shaft and is received in the hub. The bearing device is interposed between the satellite-carrier and a cylindrical end of the bell housing.

The gear motor can also comprise one or a plurality of the characteristics which are described hereinafter, taken alone or in combination.

In the case when the gear motor is fitted around a rotary central shaft, the cylindrical receptacle being formed in a housing, the rotor bearing can be interposed between the shaft and the stator of the electric motor for centring of the shaft at the first end of the gear motor, the shaft being fitted independently from the central shaft, in particular with a radial gap which is sufficient to avoid any contact.

With this fitting, the gear motor is totally isolated from the central shaft. The shaft is fitted independently from the central shaft, and is self-centred by the deformable rolling elements. This self-centring of the shaft in the middle of the planet wheels also allows the gear motor to operate without being disrupted by the radial displacement of the central shaft produced by the pedalling force.

In the case when the gear motor is fitted in a hub, with the fixed shaft being formed by the central shaft of the hub, and the cylindrical receptacle being formed in a bell housing which is secured on the central shaft and is received in the hub, the rotor bearing can be designed to be interposed between the shaft and the central shaft of the hub, for centring of the shaft on the fixed shaft at the first end of the gear motor.

According to one embodiment, the bell housing comprises a connection disc secured on the central shaft, with the bearing device being interposed between the satellite-carrier and a cylindrical end of the bell housing.

According to one embodiment, the bell housing has dimensions such as to permit a certain flexibility in flexure at the level of its connection with the central shaft, such that its cylindrical end, situated in the area of engagement of the toothed crown with the planet wheels, has a certain radial flexibility in order to permit self-centring of the toothed crown relative to the planet wheels. The bell housing is self-centred by the bearing device around the satellite-carrier, which itself pivots relative to the central shaft of the hub.

According to an alternative embodiment, the bell housing is secured on the central shaft by a connection of the universal joint type. This embodiment makes it possible to block the translations in three directions, and also makes it possible to ensure the blocking of the rotation along the central axis (in order to take up the assistance torque), while releasing the two other rotations so as to allow the cylindrical end of the bell housing to be able to self-centre radially.

According to one embodiment, the gear motor comprises a supplementary bearing interposed between the satellite-carrier and the hub. This bearing makes it possible to centre the output of the gear reducer in the hub, and thus avoid the use of an Oldham seal.

According to one embodiment, the deformable rolling elements are fitted prestressed radially. Thus, the bearing does not have an initial radial gap. This prestressing must not however impede the self-centring by the planet wheels in the case of high levels of torque. The deformable rolling elements are thus deformable in the resilient domain, and it is necessary for their resilient properties to be preserved well, in particular throughout the period and in the entire temperature range of use (while avoiding any phenomenon of relaxation of stress and/or of creeping).

Preferably, the deformable rolling elements have radial prestressing which is sufficient such that, in all the extreme cases of a maximum gap between the satellite-carrier, the deformable rolling elements and the cylindrical receptacle, the nominal diameter of the deformable rolling elements is such that there is no radial gap. In this case, the deformable rolling elements must have sufficient radial resilience to accept the radial deformation imposed this time by the clamped fitting, on which there is also superimposed the radial course necessary for the self-centring.

It is however possible to tolerate a limited radial gap, i.e. without initial prestressing of the deformable rolling elements, in order to limit the amplitude of the potential radial beating of the planet wheels in the toothed ring, but this gap must then be smaller than the radial functional gap of the planet wheels in the toothed crown.

The bearing device comprises for example between ten and fifty deformable rolling elements. The increase in the number of deformable rolling elements makes it possible to increase the initial radial rigidity of the gear reducer without loss of torque.

According to one embodiment, the deformable rolling elements are formed by a series of tubular rollers positioned in a circle with respective axes parallel to one another. The tubular rollers (or cylinders or tubes), are cylindrical parts, i.e. hollow, which makes it possible to increase their radial flexibility when compressed, and makes it possible to reduce the stresses when they are subjected to ovalisation of a few hundredths of a mm.

The tubular rollers have dimensions for example such as to permit radial displacement of between 0.02 mm and 0.15 mm without risk of fatigue damage throughout the service life of the gear motor.

When the gear reducer transmits torque under load, the tubular rollers must be sufficiently flexible radially in order not to oppose the self-centring of the planet wheels of the gear reducer, such that they can find their radial balance without excessive stress. The radial rigidity of the tubular rollers must be sufficient for the deformable rolling elements to be able to be deformed, in order to permit a certain displacement of the gear reducer, while being rigid enough to be able to centre the gear reducer.

In operation, the tubular rollers rotate around themselves in the manner of a ball bearing or roller bearing. This rotation makes the tubular walls of the rollers work in rotary flexure, since the tubular walls are deformed alternately in traction then in compression, and the tubular roller must therefore have dimensions preferably such as to withstand unlimited fatigue.

According to one embodiment, the deformable rolling elements are made of polymer material, such as thermoplastic material, such as PEEK or PAI material. Many polymer materials, and more particularly PEEK or PAI thermoplastic materials, make it possible to maintain their properties at a high temperature and are not sensitive to creeping. They can withstand mechanical and temperature stresses without losing their resilience. However, the heating generated by the losses of the electric motor and the gear reducer can require the gear motor to operate at a high temperature (up to 90° C.). The resistance to creeping and/or the relaxation of stresses makes it possible to ensure that, when the deformable rolling elements remain static for a long period, they will not become ovalised, and generate a torque opposing their restarting. The PEEK or PAI materials thus make it possible to maintain very stable prestressing over a period of time.

In addition, the PEEK or PAI materials have particularly low mechanical hysteresis properties meaning that the loss of energy, associated with their cyclical deformation and the rolling of the deformable rolling elements, is negligible, which thus ensures a connection without significant friction.

Many thermoplastic materials, including PEEK or PAI or POM also have very good tribological properties, which mean that the deformable rolling elements can roll directly on a bearing race which for example is made of aluminium alloy, without a surface covering. It is thus possible to machine the bearing race by means of a simple turning operation, directly in a flange of the satellite-carrier or in the cylindrical receptacle of the housing, which makes this function of guiding in rotation very simple and economical to carry out.

More generally, deformable rolling elements produced in the form of tubular rollers made of polymer material are extremely light compared with solid balls or rollers made of steel, since their density is approximately six times lower than steel, and they are hollow instead of being solid.

According to another embodiment, the deformable rolling elements are metal tubular rollers. The tubular walls are then finer, since the moduli of elasticity are distinctly higher than with polymer materials. These deformable rolling elements are for example made of copper alloy (brass or bronze) or of aluminium alloy, or of titanium alloy, or of steel. However, coverings or surface treatment of the bearing races and/or of the deformable rolling elements are then preferably provided, as well as lubrication in order to prevent any problem of wear by contact corrosion (fretting corrosion) associated with the metal-metal contact interfaces.

According to one embodiment, the bearing device comprises a series of deformable rolling elements, for example tubular rollers, which are positioned adjacent to one another and are all identical.

According to another embodiment, the bearing device comprises two types of alternating rolling elements, i.e. the deformable rolling elements previously described, and additional rolling elements with diametral rigidity which is greater than that of the deformable rolling elements, and a diameter smaller than the deformable rolling elements, the deformable rolling elements and the additional rolling elements being positioned alternating along a bearing race.

The deformable rolling elements and the additional rolling elements alternate regularly with one another, with one additional rolling element out of two being more rigid diametrally, and with a smaller diameter than the other deformable rolling element. Thus, between two deformable rolling elements, there is always an additional rolling element which is smaller and more rigid. When two deformable rolling elements tend to approach one another, they are supported against a smaller and more rigid interposed additional rolling element, which ensures rolling without sliding with the adjacent deformable rolling elements, by rotating freely in the opposite direction. The additional rolling elements thus make it possible to reduce the friction, but also the noise, and limit the radial displacements in order to prevent damage to the deformable rolling elements.

As in the first embodiment, the deformable rolling elements centre the shaft in the cylindrical receptacle. However, in this second embodiment, the initial radial rigidity is twice as flexible (since only one rolling element out of two is in contact), and the additional rolling elements make it possible to avoid any friction between the deformable rolling elements, by rotating in the opposite direction, thus preventing these elements from colliding. In addition, in the case of overloading or temporary malfunctioning which imposes a substantial radial component, the additional rolling elements make it possible to relieve the deformable rolling elements by limiting the radial displacement, in order to prevent the elements from being damaged.

According to one embodiment, the additional rolling elements are made of a first, polymer or thermoplastic material, such as a POM material, with the deformable rolling elements being made of a second, polymer or thermoplastic material, such as of PEEK or PAI material. Alternating one tubular roller made of PEEK or PAI material out of two with a tubular roller made of polymer or thermoplastic material such as POM (or Delrin®) makes the gear motor more economical, since Delrin® is a far less costly material than PEEK, which thus also makes it possible to reduce the global cost of the gear motor.

The difference in diameters between the deformable rolling elements and the additional tubular rolling elements is for example between 1% and 5%.

The additional rolling elements have an outer diameter which is smaller than that of the deformable rolling elements, in order to ensure that there is a radial gap of, for example, between one hundredth and two tenths of a mm once assembled.

According to one embodiment, the deformable rolling elements and the additional rolling elements are tubular rollers.

The additional tubular rolling elements have for example a thickness of tubular wall greater than that of the deformable tubular rolling elements. In fact, the rigidity increases very quickly in proportion with the thickness of tubular wall of the roller.

The difference in thickness of tubular wall between the tubular rollers of the deformable rolling elements and the additional rolling elements is for example between 250% and 350%.

The additional rolling elements can also be solid rollers.

According to one embodiment, the additional rolling elements formed by the solid rollers comprise respectively a central core, in particular in order to facilitate the injection thereof. The central core has for example a cross-section in the form of an "I" (or a "one" in Roman numerals).

The gear reducer comprises for example two planet wheels which are phase-shifted in rotation by 180°, or three planet wheels which are phase-shifted relative to one another by 120°.

According to one embodiment, the satellite-carrier comprises a first flange and a second flange which are connected to one another by a series of braces, for example six braces. These braces are secured in each of the flanges. The planet wheels are interposed axially between the flanges, with the satellite-carrier thus forming a cage for the planet wheels.

The gear reducer comprises for example a first flange bearing interposed between the first flange of the satellite-carrier and the shaft, in order to centre the first flange, and a second flange bearing interposed between the second flange of the satellite-carrier and the shaft, in order to centre the second flange.

The subject of the invention is also any apparatus comprising an electrical assistance device comprising a gear motor as previously described, such as an exoskeleton, a portable electrical device or a robotisation arm.

In particular, the subject of the invention is also a cycle comprising an electrical assistance device, characterised in that the electrical assistance device comprises a gear motor as previously described, configured to be fitted in a crank gear of the cycle, on a central shaft of the crank gear or in a hub of the cycle, on the central shaft of a cycle wheel.

The principle remains substantially the same, whether the gear motor is fitted on a rotary central shaft or on a fixed central shaft. The shaft is centred at the first end (drive end (motor side)) by a single bearing (the rotor bearing), and at its second end (driven end) by the bearing device.

BRIEF DESCRIPTION OF THE FIGURES

Other advantages and characteristics will become apparent from reading the following description of a particular embodiment of the invention which is in no way limiting, as well as from the appended drawings, in which.

DETAILED DESCRIPTION

The following embodiments are examples. Although the description refers to one or a plurality of embodiments, this does not necessarily mean that each reference concerns the same embodiment, or that the characteristics apply only to a single embodiment. Simple characteristics of different embodiments can also be combined or interchanged to provide other embodiments.

Figure 1:
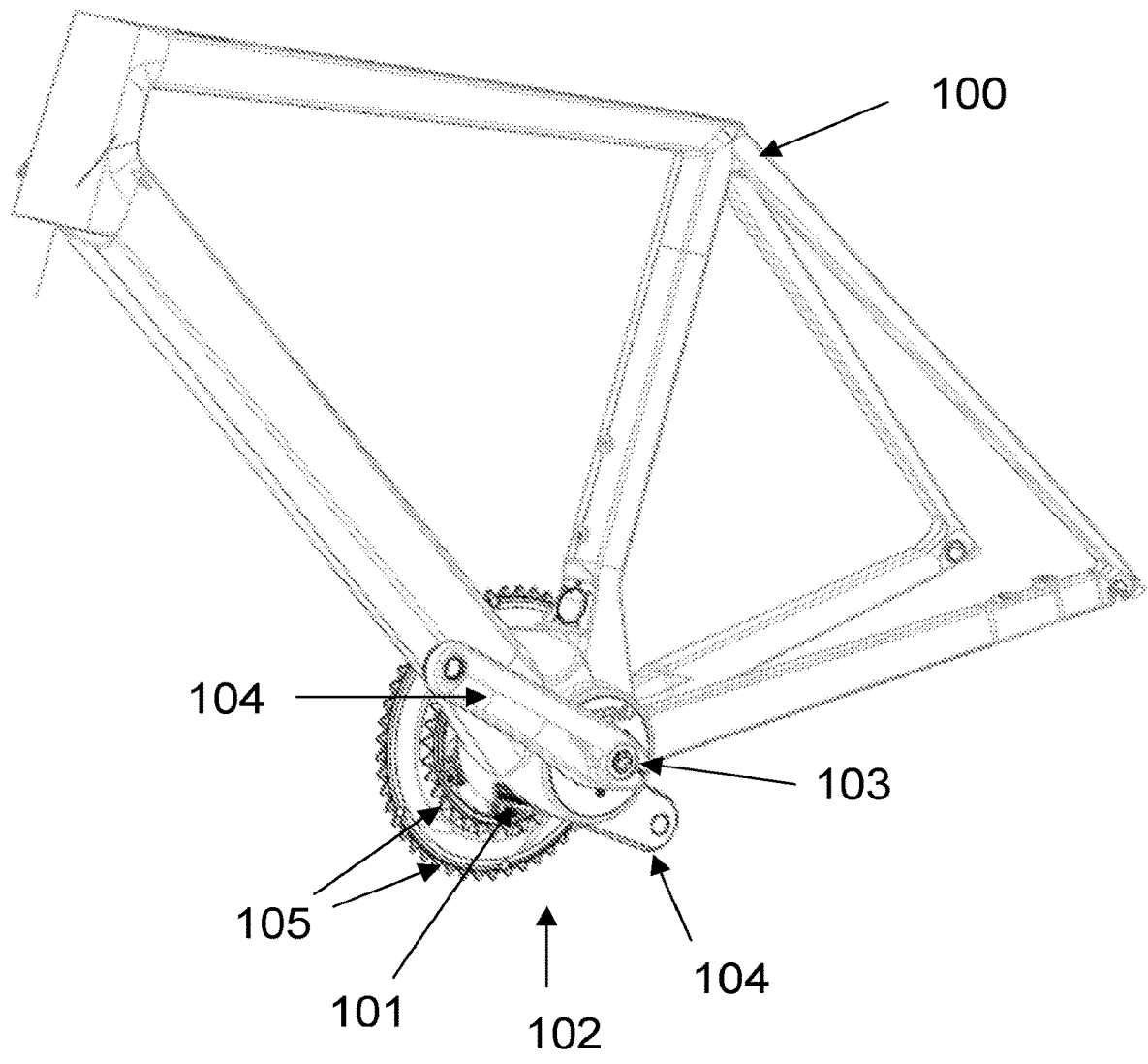
FIG. 1 shows an electrical assistance device comprising a gear motor fitted in a crank gear of a cycle.

FIG. 1 shows a frame 100 of a cycle comprising an electrical assistance device 101.

Figure 2:
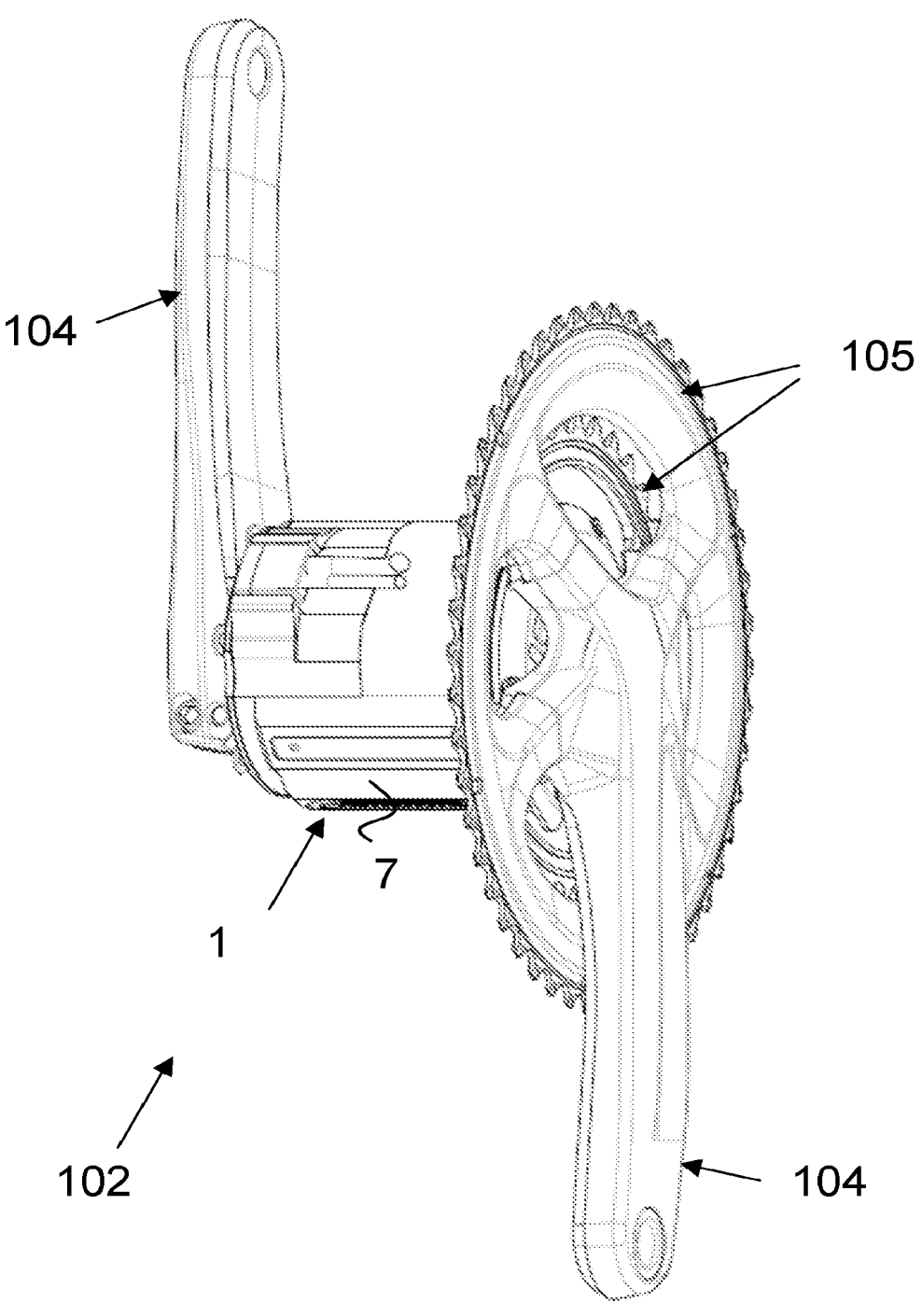
FIG. 2 shows a view in perspective of the crank gear of FIG. 1.

The electrical assistance device 101 comprises a gear motor 1 fitted in a crank gear 102 of the cycle, on the central shaft 103 of the crank gear, in a receptacle of the frame 100 (FIGS. 1 and 2).

In a known manner, the central shaft 103 of the rotary crank gear is connected to the pedals (not represented) via two cranks 104. The crank gear 102 also comprises at least one toothed plate 105, in this case two, secured on the base of one of the cranks 104 and configured to drive the chain which drives the rear wheel of the cycle.

Figure 3:
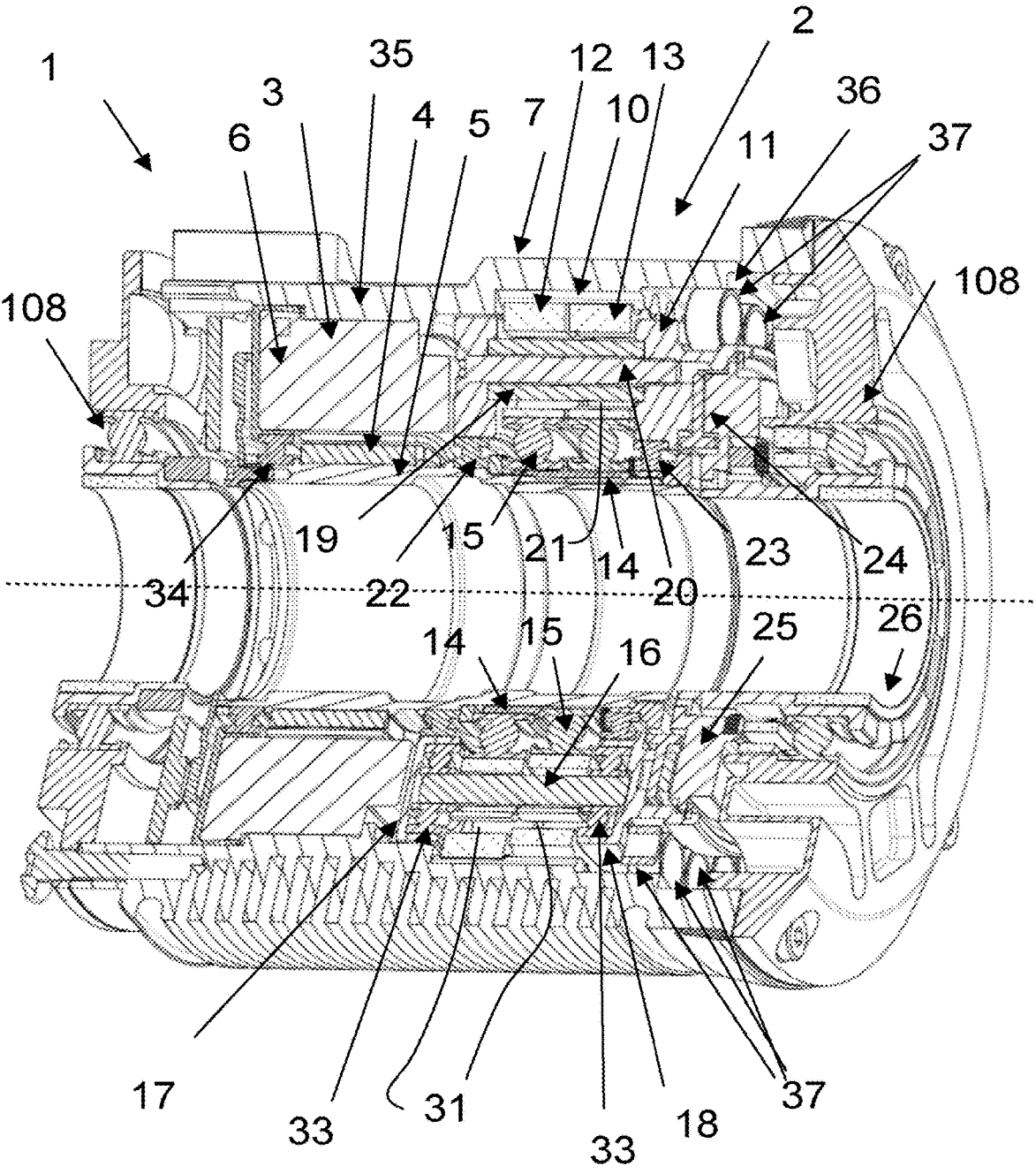
FIG. 3 shows a view in cross-section according to 2 distinct radial planes of a gear motor according to a first embodiment of the electrical assistance device of FIG. 1.

Shown more clearly in the view in axial cross-section of FIG. 3, the gear motor 1 comprises a gear reducer 2 and an electric motor 3 which are configured to be able to be fitted coaxially on the central shaft 103.

The electric motor 3 comprises a rotor 4 which is integral in rotation with a shaft 5 and a stator 6 which is secured in a housing 7 of the gear motor 1, the housing 7 itself being received and secured in the frame 100.

In this case where the gear motor 1 is fitted around the central rotary shaft 103, the cylindrical receptacle is formed in the housing 7. The housing 7 is fixed relative to the framework, i.e. relative to the frame 100 of the cycle. The fixed shaft is the shaft (axis) of the cylindrical receptacle of the housing 7.

The electric motor 3 is for example a brushless motor, the rotor 4 comprising permanent magnets which rotate in the interior of the stator 6 comprising windings, which for example are three-phase. The permanent magnets of the rotor 4 are secured on the shaft 5. Sensors for the angular position of the rotor 4 and the central shaft 103 of the crank gear 102 also make it possible to control the electric motor 3.

The shaft 5 is tubular, i.e. hollow, in order to permit the passage of the central shaft 103, which in this case is connected to the cranks 104. It forms the input of the gear reducer 2.

The gear reducer 2 comprises a toothed crown 10 which is integral with the stator 6, a satellite-carrier 11 which is fitted such as to pivot via at least one flange bearing 22, 23 around the shafts, and at least two eccentric planet wheels 12, 13 which are situated on two parallel planes. The toothed crown 10 engages in two different planes of the planet wheels 12, 13 on the inner side of the toothed crown 10. The satellite-carrier 11 forms the output of the gear reducer 2.

The planet wheels 12, 13 are fitted firstly on respective eccentric cams 14 via a respective bearing 15, and also have at least three shafts 16 of the satellite-carrier 11 passing through them. The gear reducer 2 comprises for example six shafts 16. The eccentric cams 14 are integral with the shaft 5.

The gear reducer 2 is of the cycloidal type, and makes it possible to reduce the speed of the shaft 5 with a relatively high ratio in relatively compact dimensions. The shaft 5 drives the eccentric bearings 15, which in turn drive the planet wheels 12, 13 in an eccentric cycloidal movement.

The planet wheels 12, 13 engage on the toothed crown 10 while being phase-shifted in rotation. The planet wheels 12, 13 comprise teeth with a truncated cycloidal form (or toothing developing in a circle), in this case 45 teeth, and the toothed crown 10 comprises teeth, in this case 46, having portions of cylinder which cooperate with the form of the pinions 12, 13. This toothing with a truncated cycloidal form can be seen in FIG. 4. The gear reducer 2 comprises for example two planet wheels 12, 13 which are phase-shifted in rotation by 180° (FIG. 3) or three planet wheels which are phase-shifted relative to one another by 120° (not represented). The use of a plurality of planet wheels 12, 13 which are phase-shifted in rotation makes it possible to compensate for the radial forces exerted in particular on the planet wheels 12, 13 as a result of the high output torque.

Figure 4:
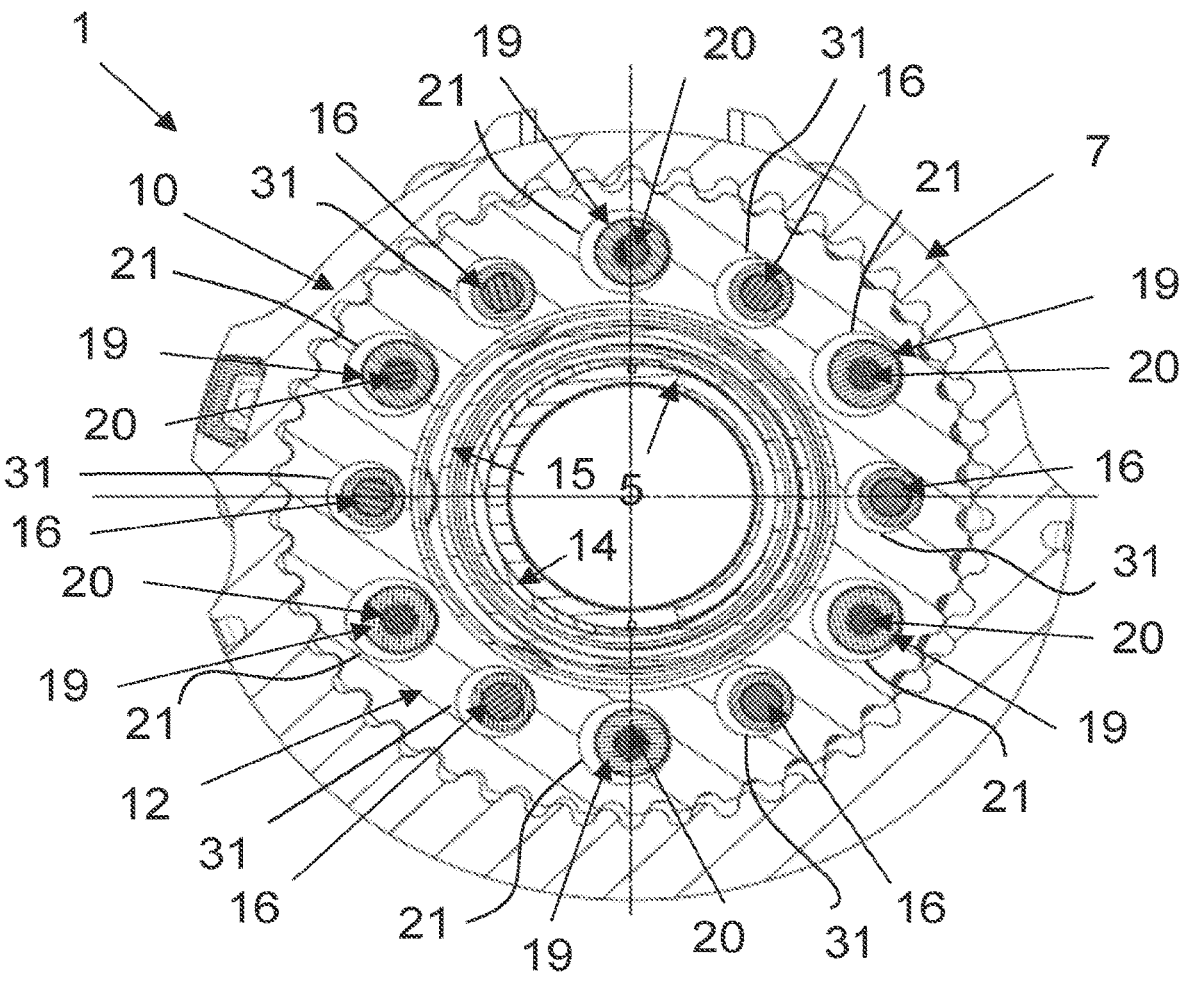
FIG. 4 shows a first view in transverse cross-section of the gear motor of FIG. 3 at the level of a planet wheel.

According to one embodiment, the satellite-carrier 11 comprises a first flange 17 and a second flange 18, which are connected to one another by a series of braces 19 (at least three), for example six braces 19 (shown in the view in transverse cross-section of FIG. 4). These braces 19 are secured in each of the flanges 17, 18 by screws 20 which pass through the braces 19 (one screw 20 per brace 19) connecting the two flanges 17, 18. The planet wheels 12, 13 are interposed axially between the flanges 17, 18, with the satellite-carrier 11 thus forming a cage coaxially with the shaft 5 and with the toothed crown 10 for the planet wheels 12, 13 which are moved out of centre by the eccentric cams 14.

The braces 19 pass through the planet wheels 12, 13 through openings 21, in this case six of them (as many openings 21 as there are braces 19), which for example are cylindrical. There is a sufficient gap between the braces 19 and the openings 21 for them not to come in contact with one another. The openings 21 are regularly formed on a circle in the faces of the planet wheels 12, 13.

The gear reducer 2 also comprises at least one flange bearing 22, 23 for centring of the satellite-carrier 11 around the shaft 5. For example, the gear reducer comprises a first flange bearing 22, interposed between the first flange 17 of the satellite-carrier 11 and the shaft 5, in order to centre the first flange 17, and a second flange bearing 23 interposed between the second flange 18 of the satellite-carrier 11 and the shaft 5, in order to centre the second flange 18 (FIG. 3).

The output torque of the gear reducer 2 is transmitted to the central shaft 103 of the crank gear by means of a rotatable coupling 24, for example an Oldham seal 24, making it possible to transmit the torque while tolerating slight radial offsetting. A free wheel 25 can be interposed between the output shaft 26 connected to the toothed plate 105 of the cycle and the output of the rotatable coupling 24, as described for example in document FR3088696. The free wheel 25 makes it possible in particular to uncouple the gear motor 1 in the case of an excessively high speed, or in the case of backpedalling or reversing, or when the cyclist no longer requires assistance.

The toothed crown 10 is secured on the housing 7 of the gear motor 1. The toothing of the crown 10 is for example produced directly in the housing 7. The pinions 12, 13 are engaged on the "fixed" toothed crown 10.

The shafts 16 passing through the faces of the planet wheels 12, 13 transmit the thrust exerted by the planet wheels 12, 13 to the satellite-carrier 11, which is the output unit of the gear reducer 2. The shafts 16 (or output shafts) rotate the output of the gear reducer 2, coaxially with the shaft 5, when the planet wheels 12, 13 rotate. The direction of rotation of the planet wheels 12, 13 and of the output is opposite that of the shaft 5, and when the shaft 5 rotates by one turn, the planet wheels 12, 13 are offset angularly by one tooth in the other direction, driving the output at a speed of rotation which is lower than the speed of rotation of the shaft 5, in this case forty five times lower.

The shafts 16 pass through all the planet wheels 12, 13. Each shaft 16 is in contact with a hole 31 of each planet wheel 12, 13, i.e. two holes 31 in the case of a gear reducer 2 with two planet wheels 12, 13. Since the shafts 16 are cylindrical, the holes 31 must comprise at least one cylindrical portion in the direction which transmits the torque. The holes 31 are for example cylindrical.

The gear motor 1 can also comprise a pair of shaft bearings 33 per shaft 16, with a shaft bearing 33 being fitted at each end of the shafts 16 (FIG. 3). There are thus twelve small shaft bearings 33 received in the flanges 17, 18 of the satellite-carrier 11 of the gear motor 1 illustrated. The advantage of these shaft bearings 33 is to minimise the losses of each of the shaft bearings 16 when they rotate under load. The shafts 16 roll without sliding in the holes 31 of each of the planet wheels 12, 13, thus minimising the losses which would be caused by the sliding under load.

The holes 31 of the planet wheels 12, 13 are provided regularly in the faces of the planet wheels 12, 13, on a circle, with the holes 31 alternating with the openings 21 in which the braces 19 pass (FIG. 4).

Figure 6:
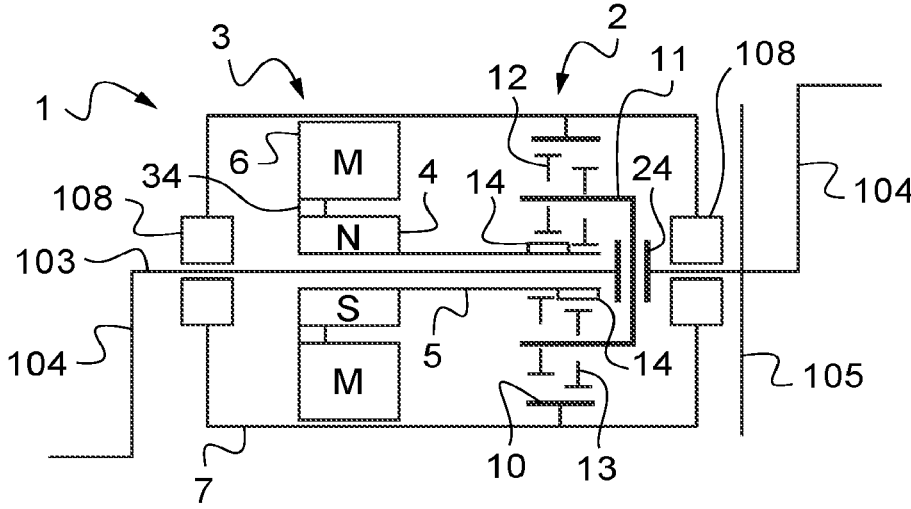
FIG. 6 is a schematic representation of the gear motor of FIG. 3.

The gear motor 1 also comprises a rotor bearing 34 which is configured to centre a first end of the shaft 5, the drive end (motor side), on a fixed shaft of the gear motor 1, and a bearing device 36 comprising deformable rolling elements 37, the bearing device 36 being interposed between the satellite-carrier 11 and a cylindrical receptacle of the housing 7, for centring of the shaft 5 in the cylindrical receptacle at a second end, the driven end (FIGS. 3 and 6).

In the example of FIGS. 1 to 6, the deformable rolling elements 37 are interposed between the second flange 18 of the satellite-carrier 11 and the cylindrical receptacle of the housing 7. A surface which receives the deformable rolling elements 37 can be provided in the satellite-carrier 11, in the second flange 18, or in the cylindrical receptacle of the housing 7.

The shaft 5 which is integral in rotation with the rotor 4 of the electric motor 3 rotates on the rotor bearing 34 placed at one of its ends, the drive end, whereas the other, driven end, is left "free or floating" in order to self-centre under the opposing radial thrust of the planet wheels 12, 13 (see the schematic FIG. 6). Thus, this second end is positioned radially by itself when a significant transmission torque is transmitted.

On the other hand, in the phases of unloaded operation, i.e. when no transmission torque is transmitted, or for low levels of torque, the second, driven end of the gear reducer 2 is self-centred by the resilient deformable rolling elements 37.

The centring of the second end by the deformable rolling elements in the case of low levels of torque makes it possible to prevent the planet wheels 12, 13 from drifting or rather beating in their functional gap, which could then give rise to an unpleasant noise; in fact, in the absence of the elements the gear reducer 2 could not be pre-positioned suitably by itself, which could also damage the toothing.

Figure 12:
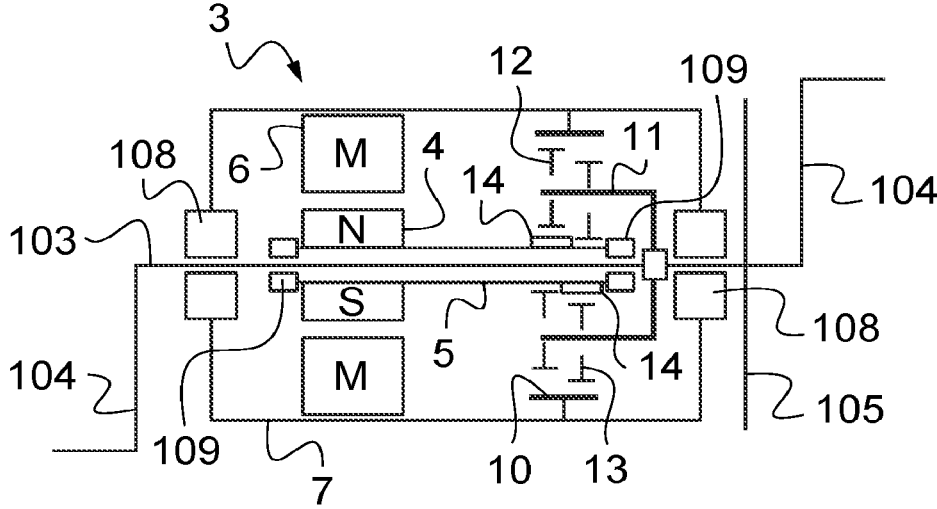
FIG. 12 is a schematic representation of a gear motor according to the prior art.

The self-centring of the shaft 5 by the deformable rolling elements 37 allows it no longer to be guided rigidly radially at its second end on the planet wheel 12, 13 side by a ball bearing, as in the prior art (FIG. 12). On the other hand, in the invention illustrated schematically in FIG. 6, this second end is allowed to self-centre until balance is obtained of the radial forces generated by each of the planet wheels 12, 13. This balance is made possible by the release of two degrees of freedom on a movement plane substantially normal to the axis of rotation of the rotor 4.

In addition, the self-centring of the planet wheels 12, 13 makes it possible to distribute better the torque transmitted by each of the pinions 12, 13. This improved distribution of the torque makes it possible to be able to produce a gear motor 1 with lower production precision, which facilitates its production and reduces its manufacturing cost. Also, the eccentric cams 14 of the planet wheels 12, 13 no longer need to be perfectly phase-shifted relative to one another. This type of defect is no longer at all problematic, since the shaft 5 is self-centred in the middle of the eccentric cams 14 under the balance of the radial forces of the planet wheels 12, 13. In addition, the absence of rigid radial guiding on the pinion 12, 13 side makes it possible for potential dissymmetries of the torque transmitted between the planet wheels 12, 13 no longer to generate an excessive radial load of the bearing on the pinion 12, 13 side, which causes noise and losses of performance, and increases the wear.

It will be appreciated that, in order to permit a slight flat displacement of the pinions 12, 13, it is necessary to provide a sufficient functional gap in the engagement of the pinions 12, 13 in the crown 10.

According to one embodiment, the deformable rolling elements 37 are fitted prestressed radially on the bearing race, such that the bearing does not have an initial radial gap. This prestressing must not however impede the self-centring by the planet wheels 12, 13 in the case of high levels of torque. The deformable rolling elements 37 are thus deformable in the resilient domain, and they must retain well their resilient properties, in particular throughout the period and in the entire temperature range of use (while avoiding any phenomenon of relaxation of stress and/or of creeping).

Preferably, the deformable rolling elements 37 have radial prestressing which is sufficient so that, in all the extreme cases of a maximum gap between the satellite-carrier 12, 13, the deformable rolling elements 37 and the cylindrical receptacle, the nominal diameter of the deformable rolling elements 37 must be such that there is no radial gap. In this case, the deformable rolling elements 37 must have sufficient radial resilience to accept the radial deformation imposed, this time by the clamped fitting, on which there is superimposed in addition the radial course necessary for the self-centring.

It is however possible to tolerate a limited radial gap, i.e. without initial prestressing of the deformable rolling elements 37, in order to limit the amplitude of the potential radial beating of the planet wheels 12, 13 in the toothed crown 10, but this gap must always be smaller than the radial functional gap of the planet wheels 12, 13 in the toothed crown 10.

In the example of FIGS. 1 to 6, where the gear motor 1 is fitted in the crank gear 102 of the cycle, and the stator 6 of the electric motor 3 is secured on the housing 7 received in the crank gear 102, the rotor bearing 34 is interposed between the shaft 5 and the stator 6 of the electric motor 3, for centring of the shaft 5 at the first, drive end of the gear motor 1, with the shaft 5 being fitted independently from the central shaft 103, in particular with a radial gap which is sufficient to avoid any contact (FIG. 3 and schematic FIG. 6).

With this fitting, the gear motor 1 is totally isolated from the central shaft 103. The shaft 5, which is fitted independently from the central shaft 103, is self-centred by the deformable rolling elements 37.

As can be seen better in the schematic FIG. 6, the shaft 5 is guided only at the first, drive end, by the rotor bearing 34 centred in the stator 6 of the electric motor 3, with the planet wheels 12 and 13 being fitted such as to pivot on their respective eccentric cams 14, and engaging in the toothed crown 10 connected to the housing 7 (in this diagram the deformable rolling elements are not represented in order to facilitate understanding). Thus, the planet wheels 12, 13 are self-centred under the effect of the balancing of the radial forces generated by the thrust of their respective toothing during the transmission of torque. The satellite-carrier 11, which is also centred on the shaft 5, transmits the output torque to the central shaft 103 of the crank gear 103 by means of the rotational coupling 24, for example of the Oldham type (schematised simplistically in FIG. 6 in order to illustrate that radial displacement is possible between the satellite-carrier 11 and the central shaft 103 of the crank gear). This self-centring of the shaft 5 in the middle of the planet wheels 12, 13 allows the gear motor 1 to operate without being disrupted by the radial displacement of the central shaft 103, produced by the pedalling force.

Figure 5:
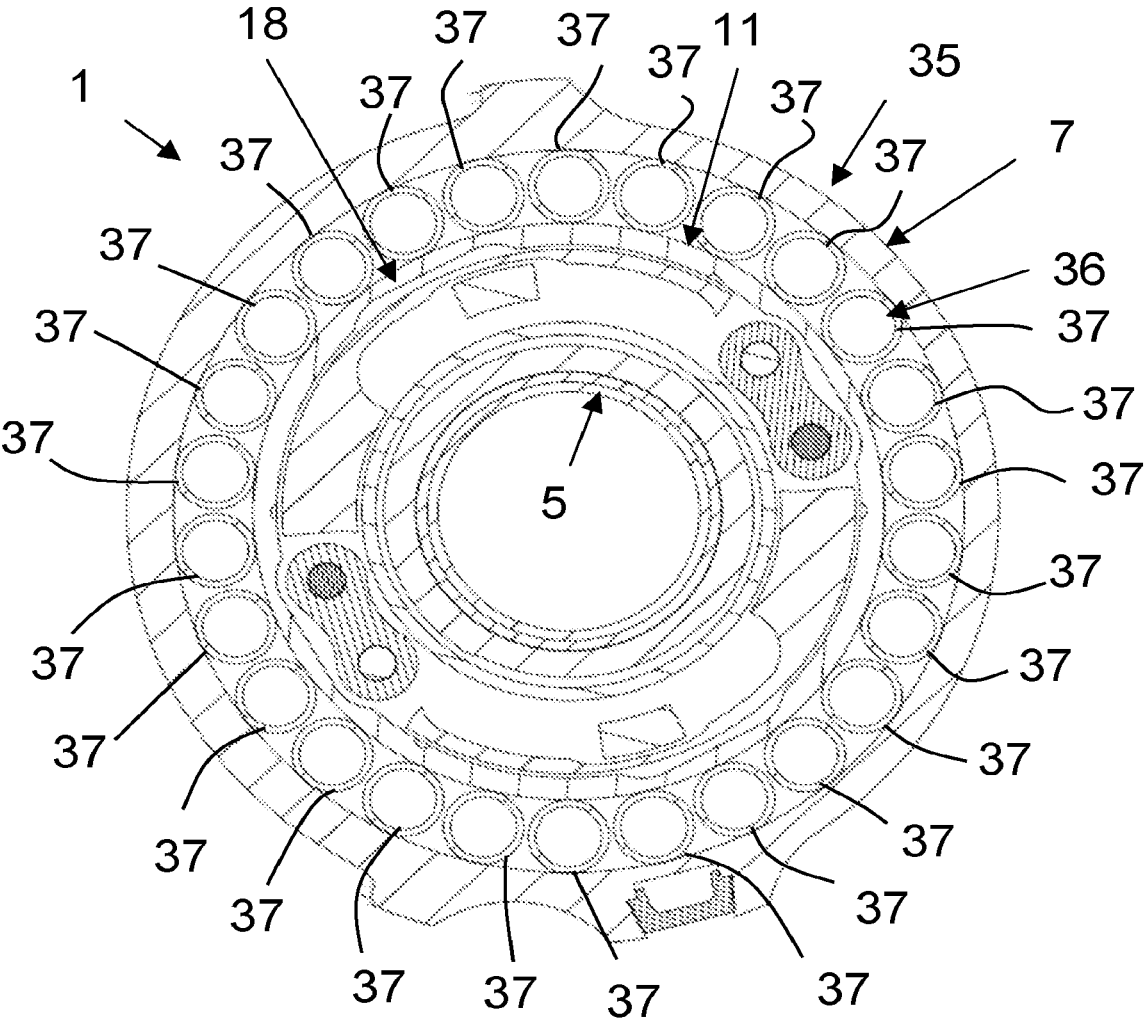
FIG. 5 shows a second view in transverse cross-section of the gear motor of FIG. 3 at the level of a bearing device.

According to one embodiment, the deformable rolling elements 37 are formed by a series of tubular rollers positioned in a circle with respective axes which are parallel to one another and to an axis of the shaft 5 (FIG. 5). The tubular rollers (or cylinders or tubes) are cylindrical parts, i.e. they are hollow, which makes it possible to increase their radial flexibility when compressed, and allows the stresses to be reduced when they are subjected to ovalisation of a few hundredths of mm.

The tubular rollers have for example dimensions such as to permit radial displacement of between 0.02 mm and 0.15 mm without a risk of fatigue damage throughout the service life of the gear motor 1.

When the gear reducer 2 transmits torque under load, the tubular rollers must be sufficiently flexible radially in order not to oppose the self-centring of the planet wheels 12, 13 of the gear reducer 2, such that they can obtain their radial balance without excessive stress. The radial rigidity of the tubular rollers must be sufficient for the deformable rolling elements 37 to be able to be deformed in order to permit a certain displacement of the gear reducer 2, while being sufficiently rigid to be able to centre the gear reducer 2.

In operation, the tubular rollers rotate around themselves in the manner of a ball bearing or a roller bearing. This rotation makes the tubular walls of the rollers work in rotary flexure, since the tubular walls are deformed alternately in traction then in compression, and the tubular roller must therefore have dimensions such as, preferably, to withstand unlimited fatigue.

The bearing device 36 comprises for example between ten and fifty deformable rolling elements 37. The increase in the number of deformable rolling elements 37 makes it possible to increase the initial radial rigidity of the gear reducer 2 without loss of torque.

According to one embodiment, the deformable rolling elements 37 are made of polymer material, such as thermoplastic material, such as PEEK or PAI material.

Many polymer materials, and more particularly PEEK or PAI thermoplastic materials, make it possible to maintain their properties at a high temperature and are not sensitive to creeping. They can withstand mechanical and temperature stresses without losing their resilience. However, the heating generated by the losses of the electric motor 3 and of the gear reducer 2 can make it necessary for the gear motor 1 to operate at a high temperature (up to 90° C.). The resistance to creeping and/or the relaxation of stresses means that, when the deformable rolling elements 37 remain static for a long period, they are not ovalised, and do not generate torque which opposes their restarting. The PEEK or PAI materials thus make it possible to maintain very stable prestressing over a period of time.

In addition, the PEEK or PAI materials have mechanical hysteresis properties which are particularly low, and ensure that the loss of energy, associated with their cyclical deformation and the rolling of the deformable rolling elements 37, is negligible, which thus provides a connection without significant friction.

Many thermoplastic materials including PEEK or PAI or POM also have very good tribological properties, which mean that the deformable rolling elements 37 can roll directly on a bearing race, which for example is made of aluminium alloy, without a surface covering. It is thus possible to machine the bearing race by means of a simple turning operation, directly in a flange 18 of the satellite-carrier 11, or in the cylindrical receptacle of the housing 7, which makes this function of guiding in rotation very simple to carry out and economical.

The bearing device 36 comprises for example a series of deformable rolling elements 37, for example tubular rollers, which are positioned adjacent to one another, and are all identical (FIG. 5). The deformable rolling elements 37 are positioned with a gap on the bearing race, thus permitting their ovalisation.

By way of example, the deformable rolling elements 37 are PEEK tubular rollers with a diameter of 7.4 mm and a length of 3.8 mm, and have a tubular wall thickness of 0.65 mm, which provides them with diametral rigidity of 60 N/mm. There are for example 26 tubular rollers made of PEEK material with rigidity of K=60N/mm, i.e. radial rigidity of the bearing of 780 N/mm.

The cylindrical receptacle of the housing 7 has a diameter of 72.62 mm +/−0.015, and the diameter of the shaft of the satellite-carrier 11 of the gear reducer 2 is 58 mm +/−0.01 mm. The nominal clamping of the tubular rollers (pre-stressed) is thus (72.62-58)/2-7.4=7.31−7.4 =0.09 mm +/−0.04 mm, generating a radial force of 60×0.09 =5.4 N, which is a level of stress which the PEEK can perfectly well withstand for an almost unlimited period of time without risk of relaxation at the temperature of use (maximum permanent stress of approximately 20 MPa).

Deformable rolling elements 37 produced in the form of tubular rollers made of polymer material are extremely light compared with solid balls or rollers made of steel, since their density is approximately six times lower than steel, and they are hollow instead of being solid. Thus, a tubular roller made of polymer material weighs for example approximately 0.1 g (0.07 g for a PEEK tubular roller), i.e. less than 3 g for a set of twenty six PEEK tubular rollers, and without excess weight for the bearing races, since these can be machined directly in the parts. This structure where the deformable rolling elements 37 are hollow rollers made of polymer thus makes it possible to produce a particularly light gear motor 1.

According to another example, the deformable rolling elements 37 are metal tubular rollers. The tubular walls are thus finer, since the moduli of elasticity are distinctly higher than with polymer materials. These deformable rolling elements 37 are for example made of copper alloy (brass or bronze), or of aluminium alloy or of titanium alloy or of steel. However, coverings or surface treatments are preferably provided for the bearing races and/or the deformable rolling elements, as well as lubrication, in order to avoid any problem of wear by contact corrosion (fretting corrosion) associated with the metal-metal contact interfaces.

Figure 7:
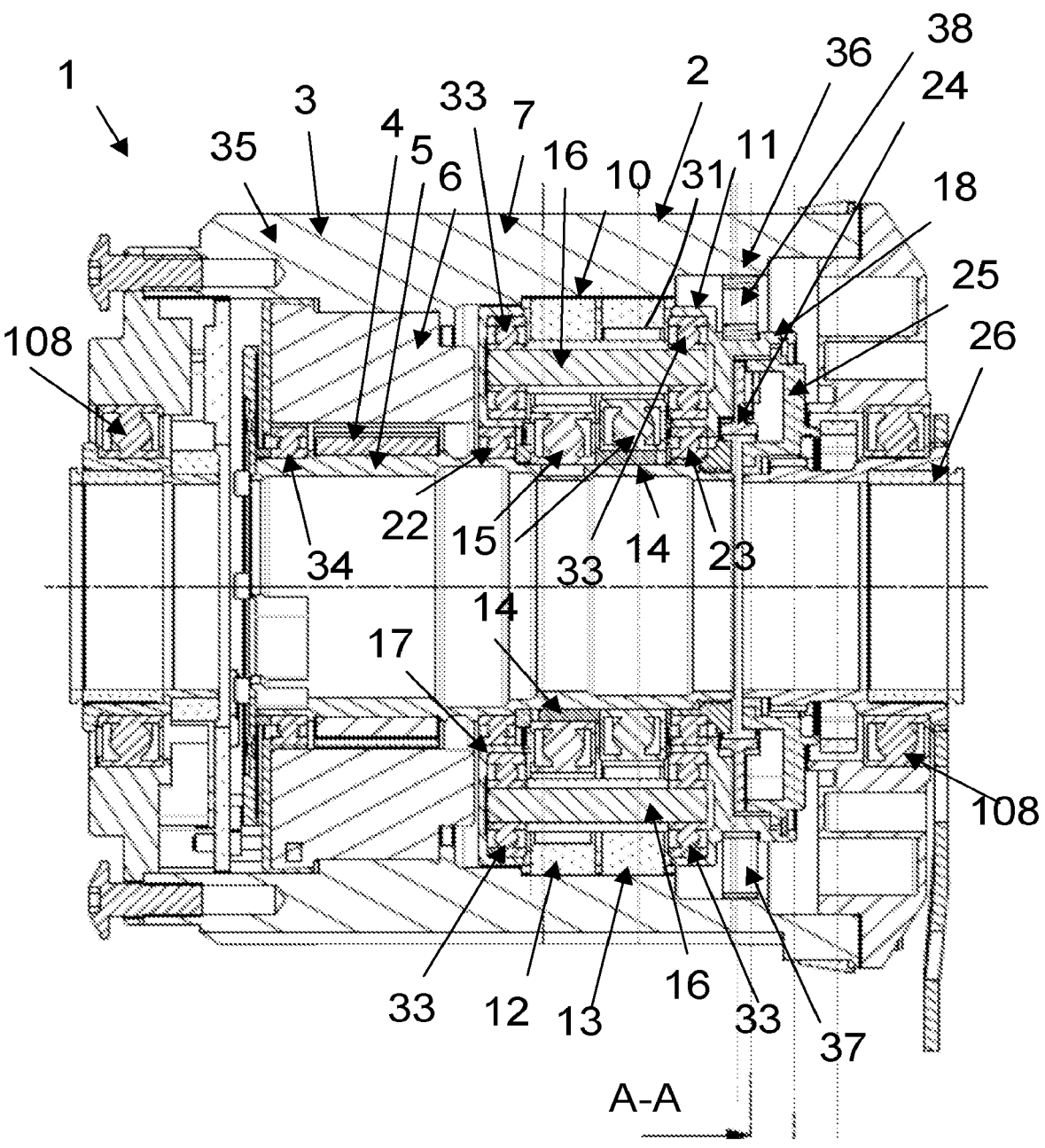
FIG. 7 is a view in axial cross-section of a gear motor according to a second embodiment.
Figure 8:
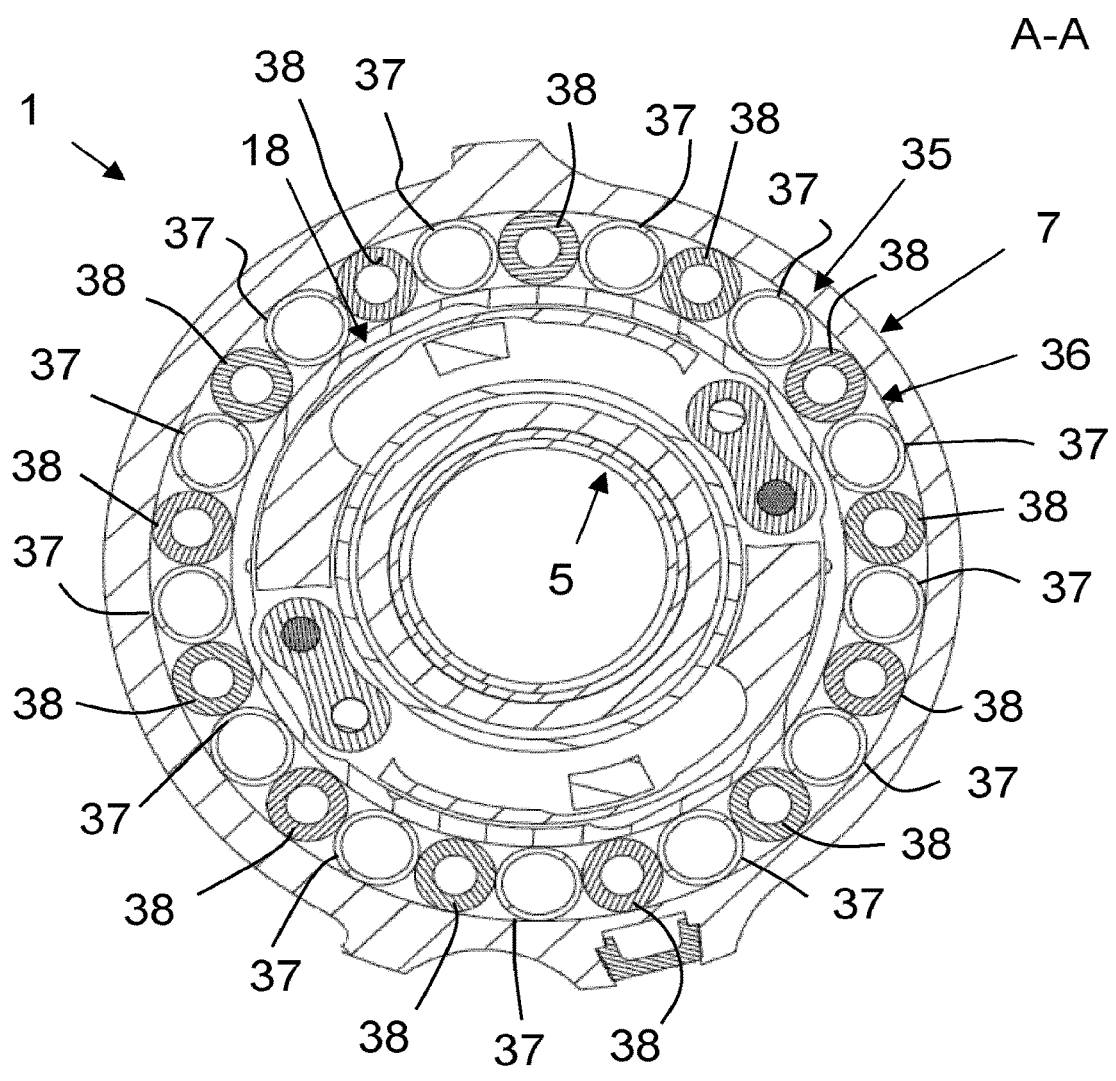
FIG. 8 shows a view in transverse cross-section A-A of the gear motor of FIG. 7.
Figure 9:
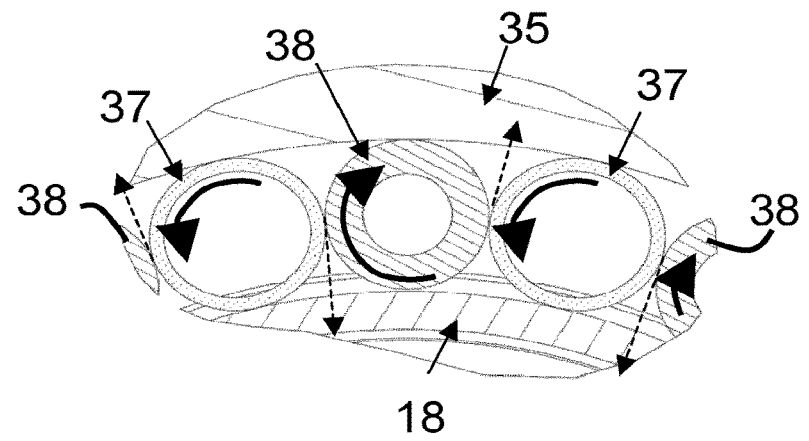
FIG. 9 shows an enlarged view of a detail of FIG. 9.

FIGS. 7 to 9 illustrate a second embodiment of the bearing device 36.

This embodiment differs from the previous one in that the bearing device 36 comprises two types of alternating rolling elements, i.e. the deformable rolling elements 37 previously described and additional rolling elements 38 with diametral rigidity which is greater than that of the deformable rolling elements 37, and a diameter smaller than that of the deformable rolling elements 37, the deformable rolling elements 37 and the additional rolling elements 38 being positioned alternating along the bearing race (FIG. 8).

The additional rolling elements 38 are for example tubular rollers.

The difference in diameters between the deformable rolling elements 37 and the additional tubular rolling elements 38 is for example between 1% and 5%.

The additional rolling elements 38 have an outer diameter which is smaller than that of the deformable rolling elements 37, in order to ensure that they have a radial gap of between one hundredth and two tenths of a mm once assembled.

The deformable rolling elements 37 and the additional rolling elements 38 alternate regularly with one another, with one additional rolling element 38 out of two being more rigid diametrally and having a smaller diameter than the other deformable rolling element 37. Thus, between two deformable rolling elements 37, there is always a smaller and more rigid additional rolling element 38. When two deformable rolling elements 37 tend to approach one another, they are supported against an interposed smaller and more rigid additional rolling element 38, which ensures rolling without sliding with the adjacent deformable rolling elements 37, by rotating freely in the opposite direction (FIG. 9). The additional rolling elements 38 thus make it possible to reduce the friction, but also the noise, and limit the radial displacements in order to avoid damaging the deformable rolling elements 37.

As in the first embodiment, the deformable rolling elements 37 centre the shaft 5 in the cylindrical receptacle. However, in this second embodiment, the initial radial rigidity is twice as flexible (since only a single rolling element out of two is in contact), and the additional rolling elements 38 make it possible to avoid any friction between the deformable rolling elements 37, by rotating in the opposite direction, thus preventing the elements from colliding. In addition, in the case of overloading or temporary malfunction imposing a substantial radial component, the additional rolling elements 38 make it possible to relieve the deformable rolling elements 37, by limiting the radial displacement in order to avoid damage thereto.

The additional rolling elements 38 are for example made of a first polymer or thermoplastic material such as POM material, the deformable rolling elements 37 being made of a second polymer or thermoplastic material, such as a PEEK or PAI material. Alternating one tubular roller made of PEEK or PAI material out of two with a tubular roller made of polymer or thermoplastic material such as POM (or Delrin®) makes the gear motor 1 more economical, since Delrin® is a far less costly material than PEEK, which also makes it possible to reduce the global cost of the system.

The deformable rolling elements 37 and the additional rolling elements 38 are for example tubular rollers, with the additional rolling elements 38 having a tubular wall thickness which is greater than that of the deformable rolling elements 37. In fact, the rigidity increases very quickly in proportion with the thickness of the tubular wall of the roller.

The difference in thickness of tubular wall between the tubular rollers of the deformable rolling elements 37 and the additional rolling elements 38 is for example between 250% and 350%.

By way of example, the tubular rollers of the deformable rolling elements 37 with a finer thickness and a larger diameter are made of PEEK material, with a respective diameter of 7.4 mm, a length of 3.8 mm, and a tubular wall thickness of 0.65 mm, which provides them with diametral rigidity of 60 N/mm. The tubular rollers of the additional rolling elements 38, which are thicker and smaller, are for example made of POM (or Delrin®) material, with a respective diameter of 7.26 mm +/−0.015 mm (for a nominal diameter of 7.31 mm, in order to come into contact, i.e. a nominal radial gap of 0.05 mm), a length of 3.8 mm, and a thickness of tubular wall of 2.5 mm.

The diametral rigidity varies substantially with the cube of the thickness of tubular wall ((2.5/0.65)³, i.e. a factor of approximately 50), but the modulus of elasticity is slightly lower for the tubular rollers of the additional rolling elements 38 made of POM (or Delrin®), with the modulus of elasticity of the PEEK material being 4200 MPa (at 20° C.) and the modulus of elasticity of the POM (or Delrin®) material being 3000 MPa (at 20° C.). The tubular rollers of the additional rolling elements 38 made of POM (or Delrin®), which are thicker, are thus approximately 30 times more rigid radially than the tubular rollers of the deformable rolling elements 37 made of PEEK. The rigidity of the tubular rollers made of POM (or Delrin®) is thus far greater than that of the tubular rollers made of PEEK.

There are for example thirteen deformable rolling elements 37 provided by tubular rollers made of PEEK material alternating with thirteen additional rolling elements 38 made of thicker tubular rollers of POM material (FIG. 8).

The alternation of the tubular rollers made of PEEK material with tubular rollers made of POM (or Delrin®) material reduces the initial rigidity of the bearing by half to 390 N/mm. This value rises to 1600 N/mm when the tubular rollers made of POM (or Delrin®) come into contact. This association makes it possible to obtain a very flexible variable rigidity initially, which rigidifies rapidly in order to avoid excessive radial displacements, which could firstly damage the PEEK tubular rollers, and secondly give rise to abnormal noise if the radial displacement became excessive.

The additional rolling elements 38 can also be solid, such as, for example, solid rollers or solid balls.

According to one embodiment, the additional rolling elements 38 produced in the form of solid rollers comprise respectively a central core, in particular in order to facilitate the injection thereof. The central core has for example a cross-section in the form of an "I" (or a "one" in Roman figures).

Figure 10:
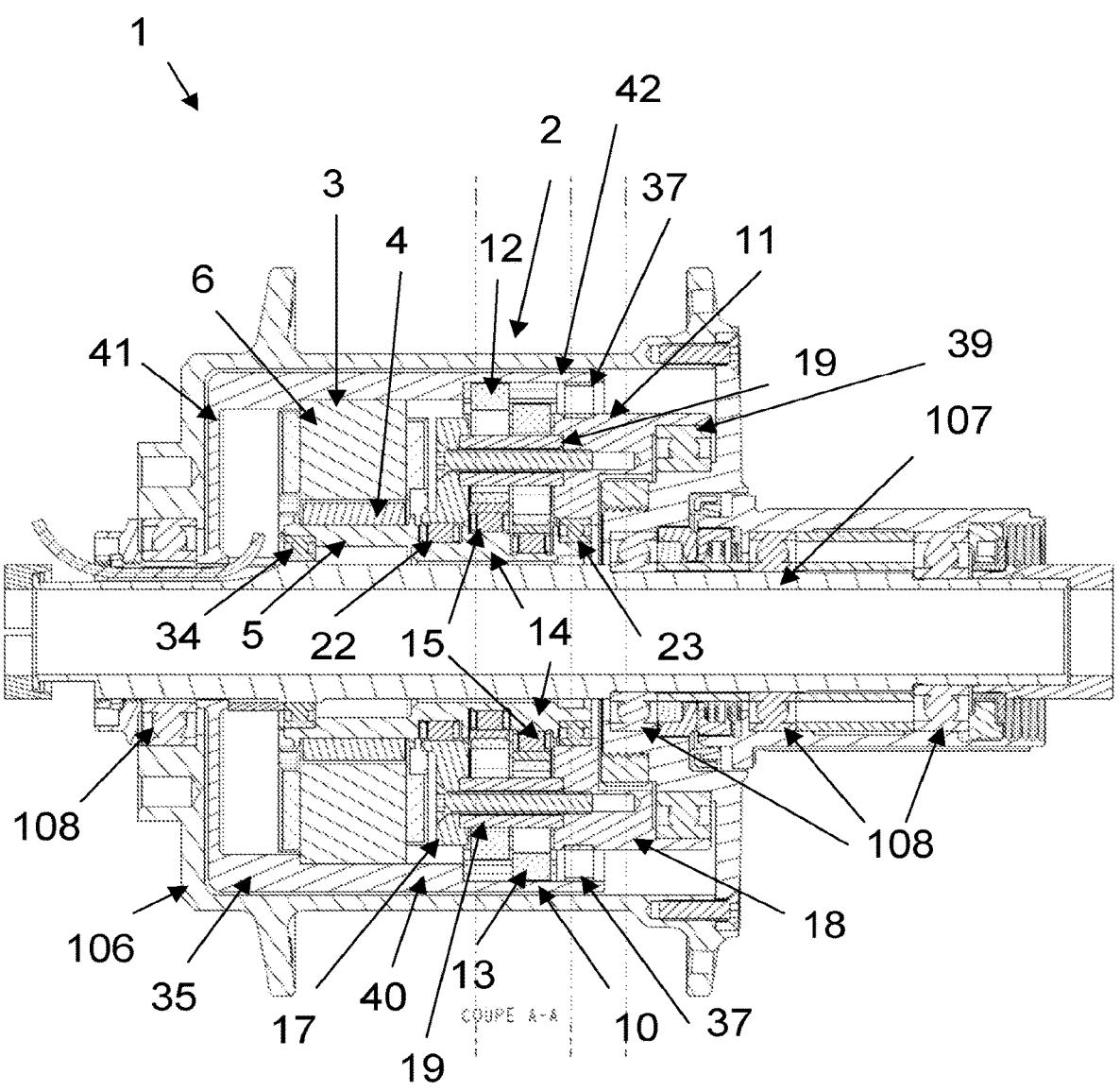
FIG. 10 shows a view in axial cross-section of a gear motor according to the second embodiment, fitted in a rear hub of the cycle.
Figure 11:
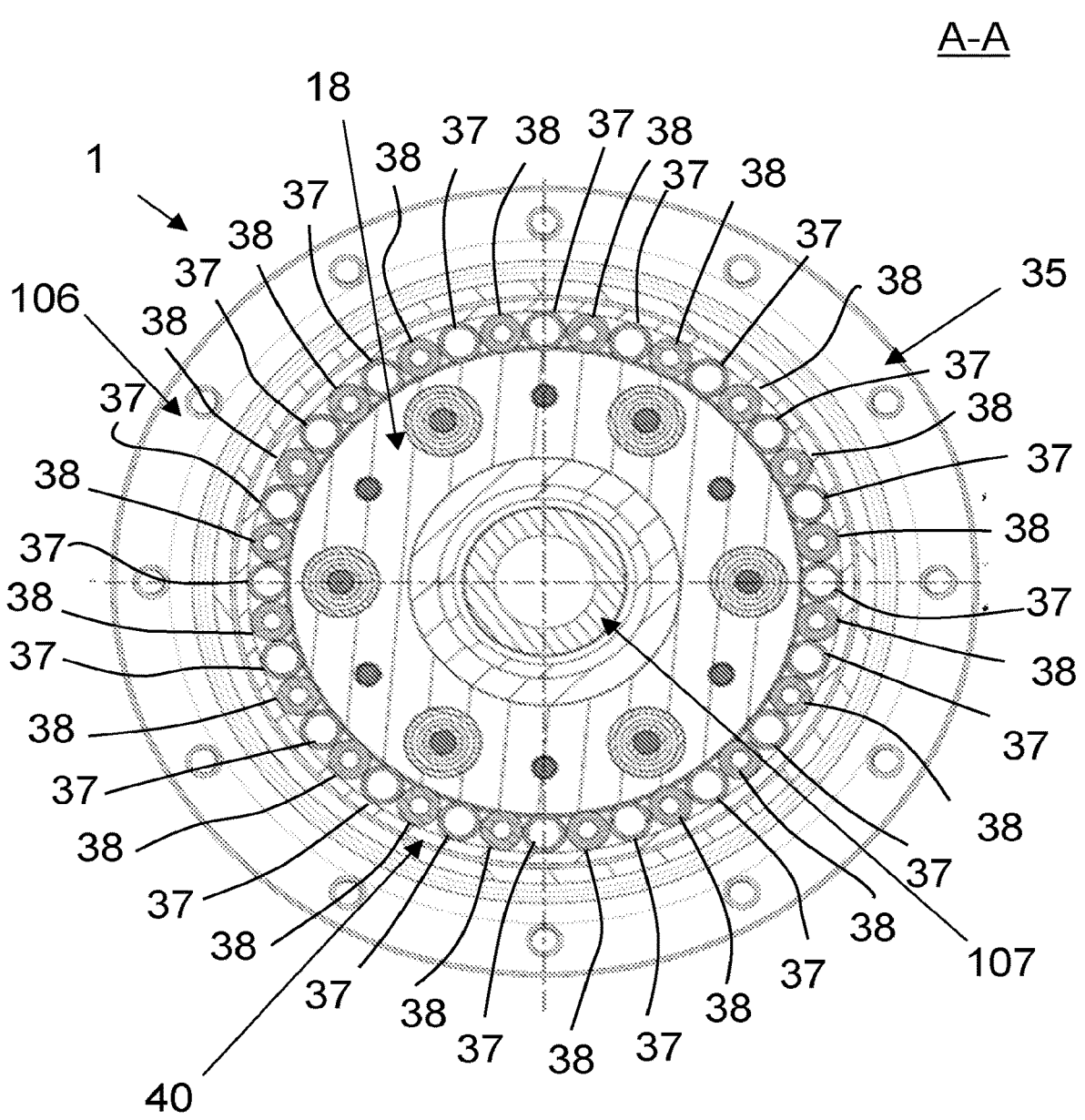
FIG. 11 shows a view in transverse cross-section of the gear motor of FIG. 10 at the level of the bearing device.

FIGS. 10 and 11 show a gear motor 1 produced according to the second embodiment.

In this example, the gear motor 1 is fitted in a hub 106, for example of a cycle wheel. The fixed shaft is formed by the central shaft 107 of the hub. The hub 106 is assembled and rotates around the central shaft 107 via bearings 108. The central shaft 107 is fixed relative to the framework, i.e. relative to the frame 100 of the cycle.

The gear reducer 2 and the electric motor 3 are fitted coaxially on the central shaft 107.

The cylindrical receptacle is formed in a bell housing 40 which is secured on the central shaft 107 in order to permit the transmission of the assistance torque. The bell housing 40 is received in the hub 106.

The stator 6 of the electric motor 3 is secured in the bell housing 40 of the gear motor 1.

The toothed crown 10 is secured in the bell housing 40 of the gear motor 1. The toothing of the crown 10 is for example produced directly in the bell housing 40. The planet wheels 12, 13 are engaged on the "fixed" toothed crown 10.

According to one embodiment, the bell housing 40 comprises a connection disc 41 secured on the central shaft 107 at the level of an annular base, with the bearing device 36 being interposed between the satellite-carrier 11 and a cylindrical end 42 of the bell housing 40.

More specifically, the deformable rolling elements 37, and, in the illustrative example, the additional rolling elements 38, are interposed between the second flange 18 of the satellite-carrier 11 and the cylindrical end 42 of the bell housing 40. A surface which receives the deformable rolling elements 37, and, if applicable, the additional rolling elements 38, can be provided in the satellite-carrier 11, in the second flange 18, or in the cylindrical end 42 of the bell housing 40.

According to one embodiment, the bell housing 40 has dimensions such as to permit a certain flexibility in flexure at the level of the disc 41 for fixed connection to the central shaft 107, such that the cylindrical end 42, situated in the area of engagement of the toothed crown 10 with the planet wheels 12, 13, has a certain radial flexibility, in order to permit self-centring of the toothed crown 10 relative to the planet wheels 12, 13. Thus, the bell housing 40 is self-centred by the bearing device 36 in the satellite-carrier 11, which itself pivots relative to the central shaft 107 of the hub 106.

According to one embodiment, the rotor bearing 34 is interposed between the shaft 5 and the central shaft 107, for centring of the shaft 5 on the central shaft 107.

The principle remains substantially the same, whether the gear motor 1 is fitted on a rotary central shaft 103 or on a fixed central shaft 107 of the hub. The shaft 5 is centred in the cylindrical receptacle by a single bearing (the rotor bearing 34) at one of its ends. The flanges 17, 18 of the gear reducer 2 are self-centred by the bearing device 36 in the bell housing 40.

There are for example 20 deformable tubular rolling elements 37 made of PEEK material alternating with 20 thicker additional rolling elements 38 made of POM material (FIG. 11).

According to one embodiment, the gear motor 1 comprises a supplementary bearing 39 interposed between the satellite-carrier 11, at the level of the second flange 18, and the hub 106 (FIG. 10). This bearing 39 makes it possible to centre the output of the gear reducer 2 in the hub 106, and thus avoid the use of an Oldham seal.

The other characteristics of this example are similar to the first embodiments previously described. In particular, the bearing device 36 can also comprise a series of deformable rolling elements 37, for example tubular rollers, positioned adjacent to one another, and all identical (not represented).

Although the invention has been described with reference to an electrical assistance device for a cycle, the invention also applies to any apparatus comprising an electrical assistance device comprising a gear motor, such as an exoskeleton, a portable electrical device, or a robotisation arm.

The invention claimed is:

1. A gear motor of an electrical assistance device, comprising:
   a gear reducer and an electric motor which are configured to be able to be fitted coaxially on a central shaft, the electric motor comprising a stator and a rotor which are integral in rotation with a shaft forming an input of the gear reducer, the gear reducer comprising:
   a toothed crown which is integral with the stator;
   a satellite-carrier which is fitted such as to pivot via at least one flange bearing around the shaft, the satellite-carrier forming an output of the gear reducer;
   at least two planet wheels which are fitted firstly on respective eccentric cams via a respective bearing, the eccentric cams being integral with the shaft, the planet wheels engaging on the toothed crown while being phase-shifted in rotation;
   a rotor bearing which is configured to center a first end of the shaft on a fixed shaft of the gear motor; and
   a bearing device comprising deformable rolling elements, the bearing device being interposed between the satellite-carrier and a cylindrical receptacle which is integral with the stator, for the centering of the shaft in the cylindrical receptacle at a second end,
   wherein the gear motor further comprises a rotatable coupling configured to transmit an output torque of the gear reducer to the central shaft.

2. The gear motor according to claim 1, wherein the deformable rolling elements are fitted prestressed radially.

3. The gear motor according to claim 1, wherein the rotor bearing is interposed between the shaft and the stator of the electric motor, the shaft being fitted independently from the central shaft.

4. The gear motor according to claim 1, wherein the fixed shaft is formed by the central shaft of a hub, the cylindrical receptacle being formed by a bell housing which is secured on the central shaft and is designed to be received in the hub, the rotor bearing being configured to be interposed between the shaft and the central shaft for centering of the shaft on the fixed shaft.

5. The gear motor according to claim 4, wherein the bell housing comprises a connection disc which is secured on the central shaft, the bearing device being interposed between the satellite-carrier and a cylindrical end of the bell housing.

6. The gear motor according to claim 4, further comprising a supplementary bearing interposed between the satellite-carrier and the hub.

7. The gear motor according to claim 1, wherein the deformable rolling elements are formed by a series of tubular rollers positioned in a circle with respective axes which are parallel to one another.

8. The gear motor according to claim 7, wherein the tubular rollers have dimensions configured to permit radial displacement of between 0.02 mm and 0.15 mm.

9. The gear motor according to claim 1, wherein the deformable rolling elements are made of polymer material.

10. The gear motor according to claim 1, wherein the deformable rolling elements are made of PEEK or PAI material.

11. The gear motor according to claim 1, wherein the bearing device comprises between ten and fifty deformable rolling elements.

12. The gear motor according to claim 1, wherein the bearing device comprises a series of deformable rolling elements, positioned adjacent to one another, and all identical.

13. The gear motor according to claim 12, wherein the deformable rolling elements are tubular rollers.

14. The gear motor according to claim 1, wherein the bearing device also comprises additional rolling elements with diametral rigidity which is greater than that of the deformable rolling elements and a smaller diameter than the deformable rolling elements, the additional rolling elements and the deformable rolling elements being positioned alternating along a bearing race.

15. The gear motor according to claim 14, wherein the additional rolling elements are made of a first polymer or thermoplastic material, the deformable rolling elements being made of a second polymer or thermoplastic material.

16. The gear motor according to claim 15, wherein the additional rolling elements are made of POM material, the deformable rolling elements being made of PEEK or PAI material.

17. The gear motor according to claim 14, wherein the deformable rolling elements and the additional rolling elements are tubular rollers, the additional rolling elements having a tubular wall thickness greater than that of the deformable rolling elements.

18. The gear motor according to claim 1, wherein the electrical assistance device is provided on a cycle.

19. A cycle comprising:

an electrical assistance device, the electrical assistance device comprising the gear motor according to claim 1, which is configured to be fitted in a crank gear of the cycle, on a central shaft of the crank gear, or in a hub of the cycle, on the central shaft of a cycle wheel.

20. The gear motor according to claim 1, wherein the rotor bearing is provided on the first end of the shaft and the second end of the shaft does not include a rotor bearing provided on the second end.

* * * * *